(12) United States Patent
Cui (10) Patent No.: US 11,307,759 B2
(45) Date of Patent: Apr. 19, 2022

(54) FUSION METHOD AND TERMINAL FOR TOUCH MESSAGES AND COMPUTER-READABLE STORAGE MEDIUM

(71) Applicant: ZTE CORPORATION, Guangdong (CN)

(72) Inventor: Xiaochuan Cui, Guangdong (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 0 days.

(21) Appl. No.: 16/641,289

(22) PCT Filed: Sep. 5, 2018

(86) PCT No.: PCT/CN2018/104174
§ 371 (c)(1),
(2) Date: Feb. 24, 2020

(87) PCT Pub. No.: WO2019/047853
PCT Pub. Date: Mar. 14, 2019

(65) Prior Publication Data
US 2020/0192565 A1 Jun. 18, 2020

(30) Foreign Application Priority Data
Sep. 5, 2017 (CN) .......................... 201710789940.7

(51) Int. Cl.
*G06F 3/04883* (2022.01)
*G06F 3/04845* (2022.01)
(Continued)

(52) U.S. Cl.
CPC .......... *G06F 3/04883* (2013.01); *G06F 3/041* (2013.01); *G06F 3/0488* (2013.01);
(Continued)

(58) Field of Classification Search
CPC .... G06F 3/041; G06F 3/0416; G06F 3/04845; G06F 3/0488; G06F 3/04883; G06F 7/36;
(Continued)

(56) References Cited

U.S. PATENT DOCUMENTS 8,539,384 B2* 9/2013 Hinckley ............ G06F 3/04883
715/863
8,952,867 B2 2/2015 Urawaki et al.
(Continued)

FOREIGN PATENT DOCUMENTS

CN 102681710 A 9/2012
CN 105183236 A 12/2015
(Continued)

OTHER PUBLICATIONS

WIPO, International Search Report dated Nov. 8, 2018.
(Continued)

*Primary Examiner* — Kent W Chang
*Assistant Examiner* — Sujit Shah
(74) *Attorney, Agent, or Firm* — Li & Cai Intellectual Property (USA) Office (57) ABSTRACT

The present disclosure provides a fusion method and terminal for touch messages and a computer readable storage medium. The method includes: pushing touch messages of all touch fingers from at least two different touch screens into different buffer queues for buffering; intercepting head data of each buffer queue to generate a reported data array; and acquiring states of the touch fingers according to the reported data array and packaging the states into multi-finger touch protocol data.

13 Claims, 5 Drawing Sheets

(51) Int. Cl.
  *G06F 7/36*    (2006.01)
  *G06F 9/54*    (2006.01)
  *G06F 3/041*   (2006.01)
  *G06F 3/0488*  (2022.01)

(52) U.S. Cl.
  CPC ............ *G06F 3/04845* (2013.01); *G06F 7/36* (2013.01); *G06F 9/544* (2013.01); *G06F 9/546* (2013.01); *G06F 2203/04808* (2013.01)

(58) Field of Classification Search
  CPC ..................... G06F 9/544; G06F 9/546; G06F 2203/04104; G06F 2203/04808
  USPC .................................................. 345/173–174
  See application file for complete search history.

(56) References Cited

U.S. PATENT DOCUMENTS

| | | | | |
|---|---|---|---|---|
| 2010/0245275 A1* | 9/2010 | Tanaka | .................. | G06F 1/1647 345/173 |
| 2011/0169750 A1* | 7/2011 | Pivonka | .................. | B60K 37/06 345/173 |
| 2011/0273387 A1* | 11/2011 | Urawaki | ................ | G06F 1/1647 345/173 |
| 2011/0291964 A1* | 12/2011 | Chambers | ............. | G06F 1/1643 345/173 |
| 2012/0050177 A1* | 3/2012 | Simmons | ............... | G06F 1/1641 345/173 |
| 2012/0235924 A1* | 9/2012 | Hochmuth | ............ | G06F 3/0416 345/173 |
| 2013/0234987 A1 | 9/2013 | Ye et al. | | |
| 2014/0240284 A1* | 8/2014 | Paulsen | ................. | G06F 3/0446 345/174 |

FOREIGN PATENT DOCUMENTS

| | | |
|---|---|---|
| JP | 2011237949 A | 11/2011 |
| JP | 2014089592 A | 5/2014 |

OTHER PUBLICATIONS

Europan Patent Office, Extended European Search Report dated Mar. 18, 2021 regarding EP18853856.5.

Japan Patent Office, First Office Action dated Feb. 9, 2021 regarding JP2019-572060 and the English translation thereof.

\* cited by examiner

| Time (ms) | 1st touch screen | | 2nd touch screen | |
|---|---|---|---|---|
| | 1st touch finger | 2nd touch finger | 1st touch finger | 2nd touch finger |
| 0 | | | | |
| 10 | TOUCH DOWN | | | |
| 20 | COORD(x, y, 1) | | | |
| 30 | COORD(x, y, 1) | COORD(x, y, 2) | | |
| 40 | COORD(x, y, 1) | COORD(x, y, 2) | TOUCH DOWN | |
| 50 | COORD(x, y, 1) | COORD(x, y, 2) | COORD(x, y, 1) | |
| 60 | COORD(x, y, 1) | COORD(x, y, 2) | COORD(x, y, 1) | |
| 70 | COORD(x, y, 1) | COORD(x, y, 2) | COORD(x, y, 1) | COORD(x, y, 2) |
| 80 | COORD(x, y, 1) | COORD(x, y, 2) | COORD(x, y, 1) | COORD(x, y, 2) |
| 90 | COORD(x, y, 1) | COORD(x, y, 2) | COORD(x, y, 1) | COORD(x, y, 2) |
| 100 | COORD(x, y, 1) | COORD(x, y, 2) | COORD(x, y, 1) | COORD(x, y, 2) |
| 110 | COORD(x, y, 1) | COORD(x, y, 2) | COORD(x, y, 1) | COORD(x, y, 2) |
| 120 | COORD(x, y, 1) | COORD(x, y, 2) | COORD(x, y, 1) | COORD(x, y, 2) |
| 130 | COORD(x, y, 1) | COORD(x, y, 2) | COORD(x, y, 1) | COORD(x, y, 2) |
| 140 | COORD(x, y, 1) | COORD(x, y, 2) | COORD(x, y, 1) | COORD(x, y, 2) |
| 150 | COORD(x, y, 1) | COORD(x, y, 2) | COORD(x, y, 1) | COORD(x, y, 2) |
| 160 | | COORD(x, y, 2) | COORD(x, y, 1) | COORD(x, y, 2) |
| 170 | | COORD(x, y, 2) | COORD(x, y, 1) | COORD(x, y, 2) |
| 180 | | TOUCH UP | COORD(x, y, 1) | COORD(x, y, 2) |
| 190 | | | COORD(x, y, 1) | COORD(x, y, 2) |
| 200 | | | | COORD(x, y, 2) |
| 210 | | | | COORD(x, y, 2) |
| 220 | | | | TOUCH UP |
| 230 | | | | |
| 240 | | | | |

FIG. 4

| Time (ms) | 1st touch finger | 2nd touch finger | 3rd touch finger | 4th touch finger |
|---|---|---|---|---|
| 0 | | | | |
| 10 | TOUCH DOWN | | | |
| 20 | COORD(x, y, 1) | | | |
| 30 | COORD(x, y, 1) | COORD(x, y, 2) | | |
| 40 | COORD(x, y, 1) | COORD(x, y, 2) | | |
| 50 | COORD(x, y, 1) | COORD(x, y, 2) | COORD(x, y, 3) | |
| 60 | COORD(x, y, 1) | COORD(x, y, 2) | COORD(x, y, 3) | |
| 70 | COORD(x, y, 1) | COORD(x, y, 2) | COORD(x, y, 3) | COORD(x, y, 4) |
| 80 | COORD(x, y, 1) | COORD(x, y, 2) | COORD(x, y, 3) | COORD(x, y, 4) |
| 90 | COORD(x, y, 1) | COORD(x, y, 2) | COORD(x, y, 3) | COORD(x, y, 4) |
| 100 | COORD(x, y, 1) | COORD(x, y, 2) | COORD(x, y, 3) | COORD(x, y, 4) |
| 110 | COORD(x, y, 1) | COORD(x, y, 2) | COORD(x, y, 3) | COORD(x, y, 4) |
| 120 | COORD(x, y, 1) | COORD(x, y, 2) | COORD(x, y, 3) | COORD(x, y, 4) |
| 130 | COORD(x, y, 1) | COORD(x, y, 2) | COORD(x, y, 3) | COORD(x, y, 4) |
| 140 | COORD(x, y, 1) | COORD(x, y, 2) | COORD(x, y, 3) | COORD(x, y, 4) |
| 150 | COORD(x, y, 1) | COORD(x, y, 2) | COORD(x, y, 3) | COORD(x, y, 4) |
| 160 | | COORD(x, y, 2) | COORD(x, y, 3) | COORD(x, y, 4) |
| 170 | | COORD(x, y, 2) | COORD(x, y, 3) | COORD(x, y, 4) |
| 180 | | | COORD(x, y, 3) | COORD(x, y, 4) |
| 190 | | | COORD(x, y, 3) | COORD(x, y, 4) |
| 200 | | | | COORD(x, y, 4) |
| 210 | | | | COORD(x, y, 4) |
| 220 | | | | TOUCH UP |
| 230 | | | | |
| 240 | | | | |

FUSION METHOD AND TERMINAL FOR TOUCH MESSAGES AND COMPUTER-READABLE STORAGE MEDIUM

CROSS-REFERENCE TO RELATED APPLICATIONS

This is a National Phase Application filed under 35 U.S.C. 371 as a national stage of PCT/CN2018/104174, filed on Sep. 5, 2018, an application claiming the priority of Chinese Patent Application No. 201710789940.7, filed on Sep. 5, 2017, the contents of which are incorporated herein in their entirety by reference.

TECHNICAL FIELD

The present disclosure relates to, but is not limited to, the field of communication technologies.

BACKGROUND

Dual-screen terminal devices have emerged with the development of terminal technologies. In dual-screen terminal devices in the related art, each touch screen works independently, and a system can normally respond to an event of each touch screen. However, the system fails to respond normally when the two touch screens work simultaneously. Because each individual touch screen device reports its own touch event, but the system cannot automatically integrate these protocols. As a result, when multiple fingers operate simultaneously across screens, the system cannot recognize the multiple fingers, let alone track the touch trajectory of each finger.

SUMMARY

According to an aspect of the present disclosure, there is provided a fusion method for touch messages, including: pushing touch messages of all touch fingers from at least two different touch screens into different buffer queues for buffering; intercepting head data of each buffer queue to generate a reported data array; and acquiring states of the touch fingers according to the reported data array and packaging the states into multi-finger touch protocol data.

According to another aspect of the present disclosure, there is provided a fusion terminal for touch messages, including: a memory and a processor, the memory having a computer program stored thereon which, when executed by the processor, causes the processor to perform the fusion method for touch messages according to the present disclosure.

According to another aspect of the present disclosure, there is provided a computer-readable storage medium storing a computer program thereon which, when executed by a processor, causes the processor to perform the fusion method for touch messages according to the present disclosure.

BRIEF DESCRIPTION OF THE DRAWINGS

Accompanying drawings are provided for further understanding of the embodiments of the disclosure and constitute a part of the specification. Hereinafter, these drawings are intended to explain the disclosure together with the following embodiments, but should not be considered as a limitation to the disclosure. In the drawings.

DETAILED DESCRIPTION

For clarity and better understanding of the technical problems, technical solutions and beneficial effects of the present disclosure, the present disclosure will be further described in detail below in conjunction with the accompanying drawings and embodiments. It will be appreciated that the embodiments described herein are merely for illustration of the disclosure and are not intended to limit the disclosure.

In the following description, elements described using terms such as "module", "component", or "unit" are only used for facilitating description of the present disclosure, and have no specific meaning in themselves. Thus, "module", "component" or "unit" may be used interchangeably.

Figure 1:
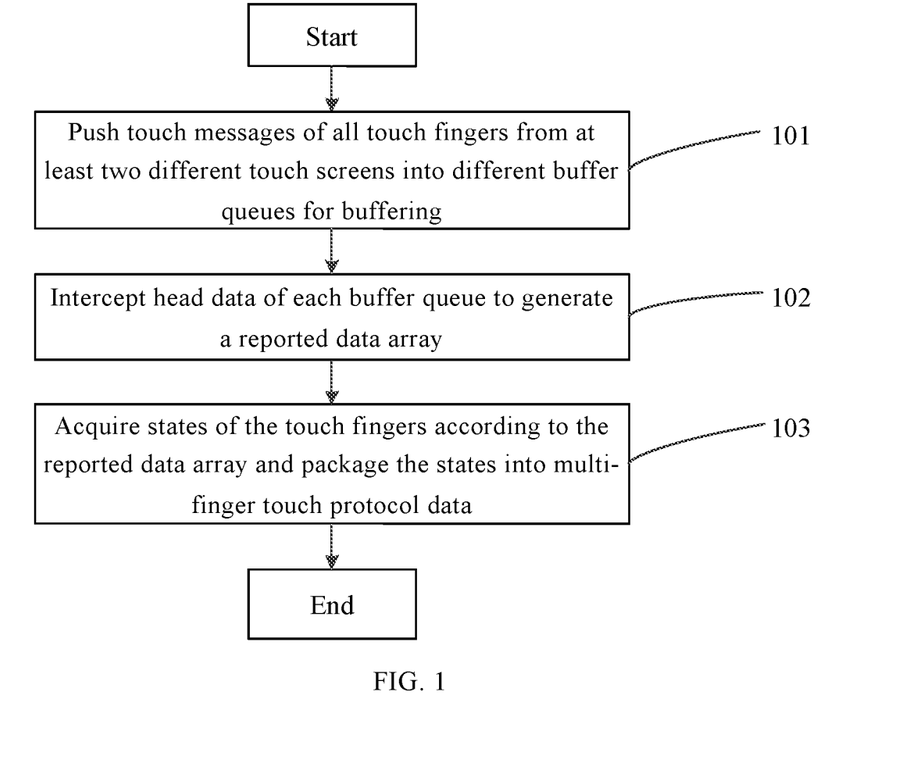
FIG. 1 is a schematic flowchart of a fusion method for touch messages according to an embodiment of the present disclosure.

FIG. 1 is a schematic flowchart of a fusion method for touch messages according to an embodiment of the present disclosure.

As shown in FIG. 1, a fusion method for touch messages according to an embodiment of the present disclosure may include steps 101 to 103.

In step 101, touch messages of all touch fingers from at least two different touch screens are pushed into different buffer queues for buffering.

These touch messages include at least one of: x and y coordinate information ABS_MT_POSITION_X and ABS_MT_POSITION_Y of a touch finger, area information ABS_MT_TOUCH_MAJOR and ABS_MT_TOUCH_MINOR of a touch finger, pressure information ABS_MT_PRESSURE of a touch finger, serial number information SLOT of a touch finger, and serial number information of a panel where a touch finger is located.

In step 102, head data of each buffer queue is intercepted to generate a reported data array.

The head data of each buffer queue may be intercepted at a predetermined interval (e.g., 10 ms), which may be the same as or similar to an interval at which the touch messages are acquired. Therefore, each reported data array includes the touch messages of all the touch fingers at the same time point.

In step 103, states of the touch fingers are acquired according to the reported data array and are packaged into multi-finger touch protocol data.

Each touch finger on each screen may be traversed starting with the first touch finger on the first touch screen to generate tracking identity information, and corresponding x and y coordinate information, area information, pressure information may be packaged as a multi-finger touch protocol message appended behind the corresponding tracking identity information.

The fusion method for touch messages according to the embodiment of the present disclosure may further include: controlling a reporting speed of the multi-finger touch protocol data according to a preset time interval.

In an embodiment of the present disclosure, the preset time interval t is calculated according to the following equation:

$$t=1/f*1000*1000-Tc-Tr$$

where f is a sampling frequency of a touch panel, Tc is consumption time of obtaining the touch messages of the touch fingers, and Tr is consumption time of packaging and reporting the multi-finger touch protocol data.

Figure 2:
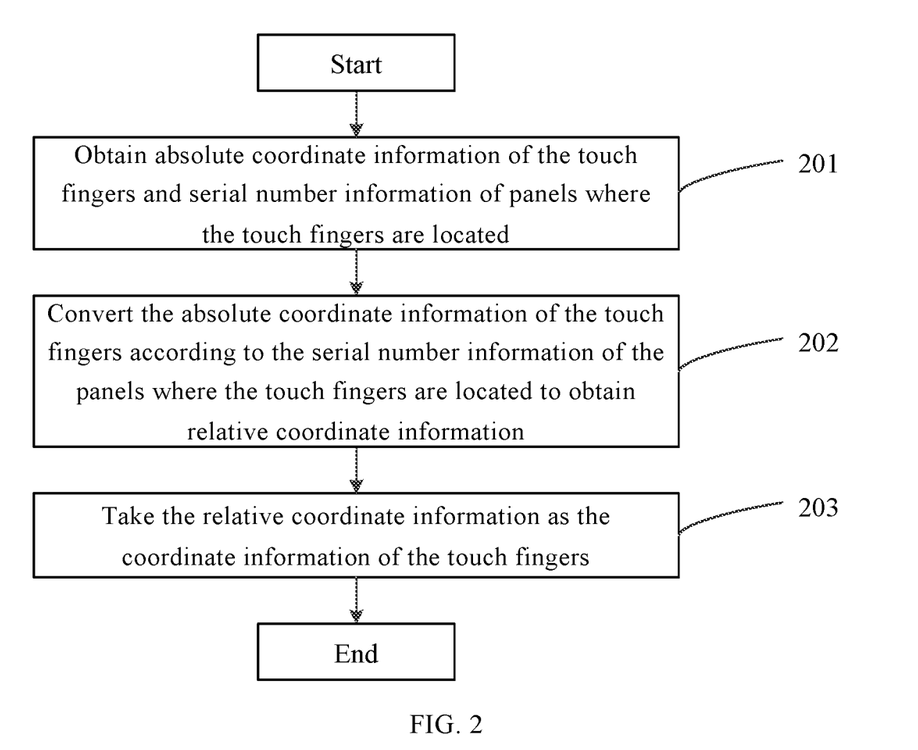
FIG. 2 is a schematic flowchart of a fusion method for touch messages according to another embodiment of the present disclosure.

FIG. 2 is a schematic flowchart of a fusion method for touch messages according to another embodiment of the present disclosure.

According to a fusion method for touch messages according to another embodiment of the present disclosure, the touch messages may include coordinate information of the touch fingers. As shown in FIG. 2, the step 101 may include steps 201 to 203.

At step 201, absolute coordinate information of the touch fingers and serial number information of panels where the touch fingers are located are obtained.

In the context of the present disclosure, absolute coordinates refer to coordinates of a touch finger on a corresponding touch panel.

At step 202, the absolute coordinate information of the touch fingers is converted according to the serial number information of the panels where the touch fingers are located to obtain relative coordinate information.

After a panel with an origin is selected according to the number as well as the arrangement and combination mode of the touch panels, the coordinates of the x axis and/or the y axis may be expanded so that all the touch panels are located in a same expanded coordinate system.

In the context of the present disclosure, relative coordinates refer to coordinates of a touch finger with respect to the expanded coordinate system.

Figure 3:
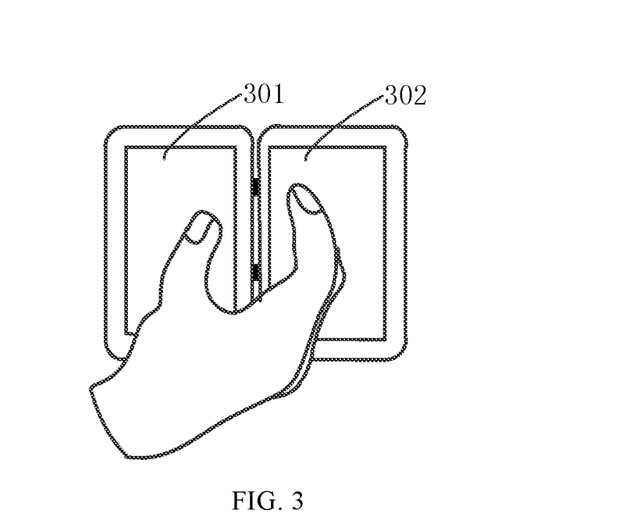
FIG. 3 is a schematic diagram of a dual-screen touch device according to an embodiment of the present disclosure.

FIG. 3 is a schematic diagram of a dual-screen touch device according to an embodiment of the present disclosure.

Taking FIG. 3 as an example, a multi-screen device includes a first touch screen 301 and a second touch screen 302 that are laterally arranged side by side. In this case, a touch screen where the origin is located may be the first touch screen 301, and then the x-axis coordinate of the coordinates corresponding to a touch finger located on the second touch screen needs to be increased by the maximum value of the first touch screen 301 on the x-axis. If the first touch screen and the second touch screen are arranged in parallel in the vertical direction, the y-axis needs to be expanded.

At step 203, the relative coordinate information is taken as the coordinate information of the touch fingers.

According to an embodiment the present disclosure, the reported data array generated in step 102 may have a constant size. If a buffer queue is empty, it indicates that there is no touch message of a corresponding touch finger in the buffer queue.

According to an embodiment the present disclosure, the number of buffer queues may be fixed, and the number of buffer queues may be determined by the maximum number of simultaneously supported touch fingers. For example, if each touch screen supports a maximum of 10 fingers, and data information of n touch screens needs to be integrated, then the number of buffer queues is 10*n.

When the touch screen generates an interruption, the touch message of the finger is pushed into a corresponding buffer queue according to the finger serial number (i.e., the serial number of the finger) reported by the firmware. Assuming that each touch screen supports 10 fingers, 10 fingers on the $1^{st}$ touch screen are pushed into queues 0 to 9; 10 fingers on the $2^{nd}$ touch screen are pushed into queues 10 to 19, so on and so forth, the $m^{th}$ (1≤m=10) finger on the $n^{th}$ touch screen is pushed into a queue (n−1)*10+(m−1). The data of each finger updated each time is buffered to the tail of the corresponding buffer queue.

In this embodiment, the multi-screen device may include a first touch screen and a second touch screen that are arranged side by side, and the first touch screen and the second touch screen both support a maximum number of 10 touch fingers.

Figure 4:
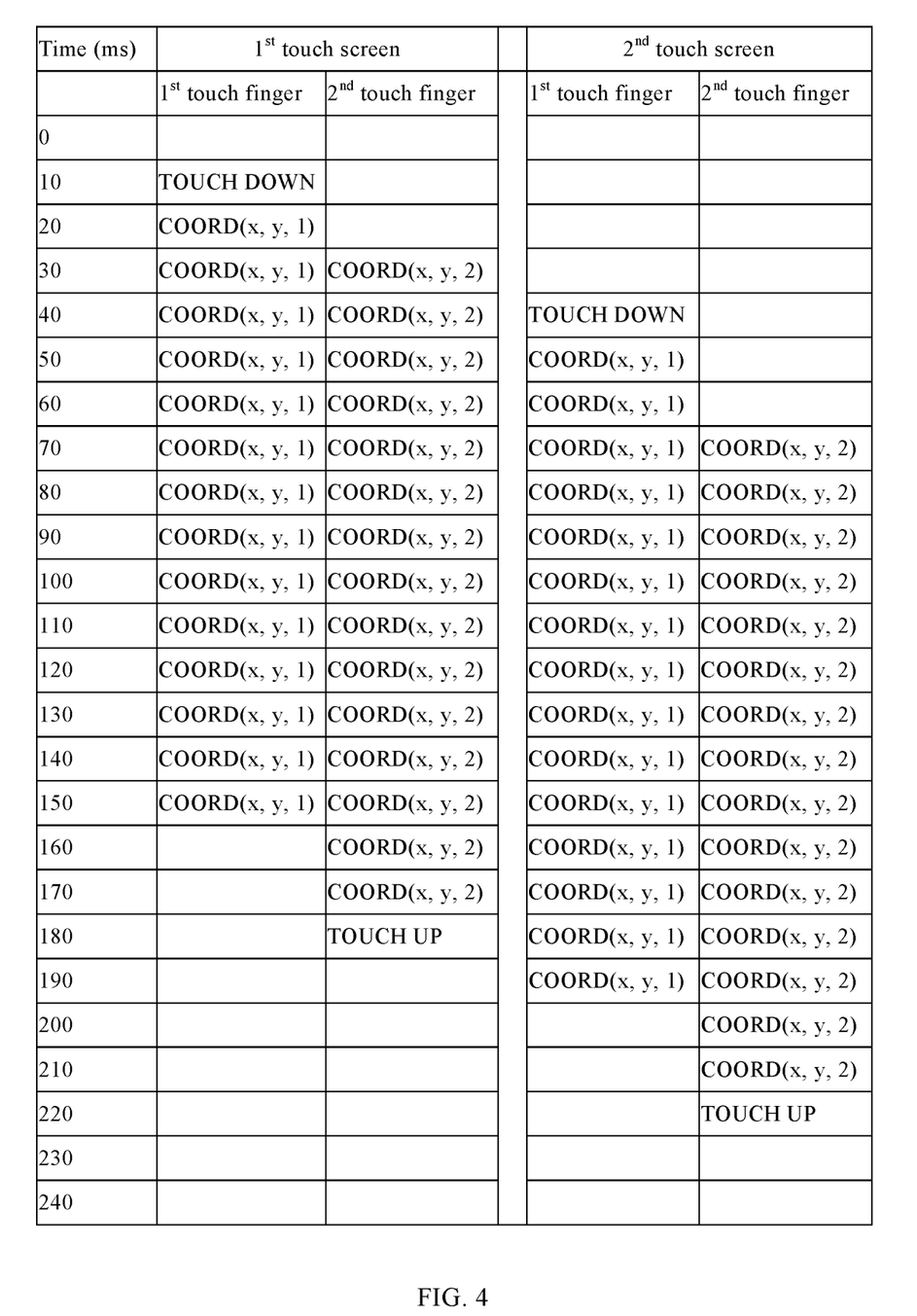
FIG. 4 is a schematic diagram showing touch messages of a first touch screen and a second touch screen before fusion according to an embodiment of the present disclosure.
Figure 5:
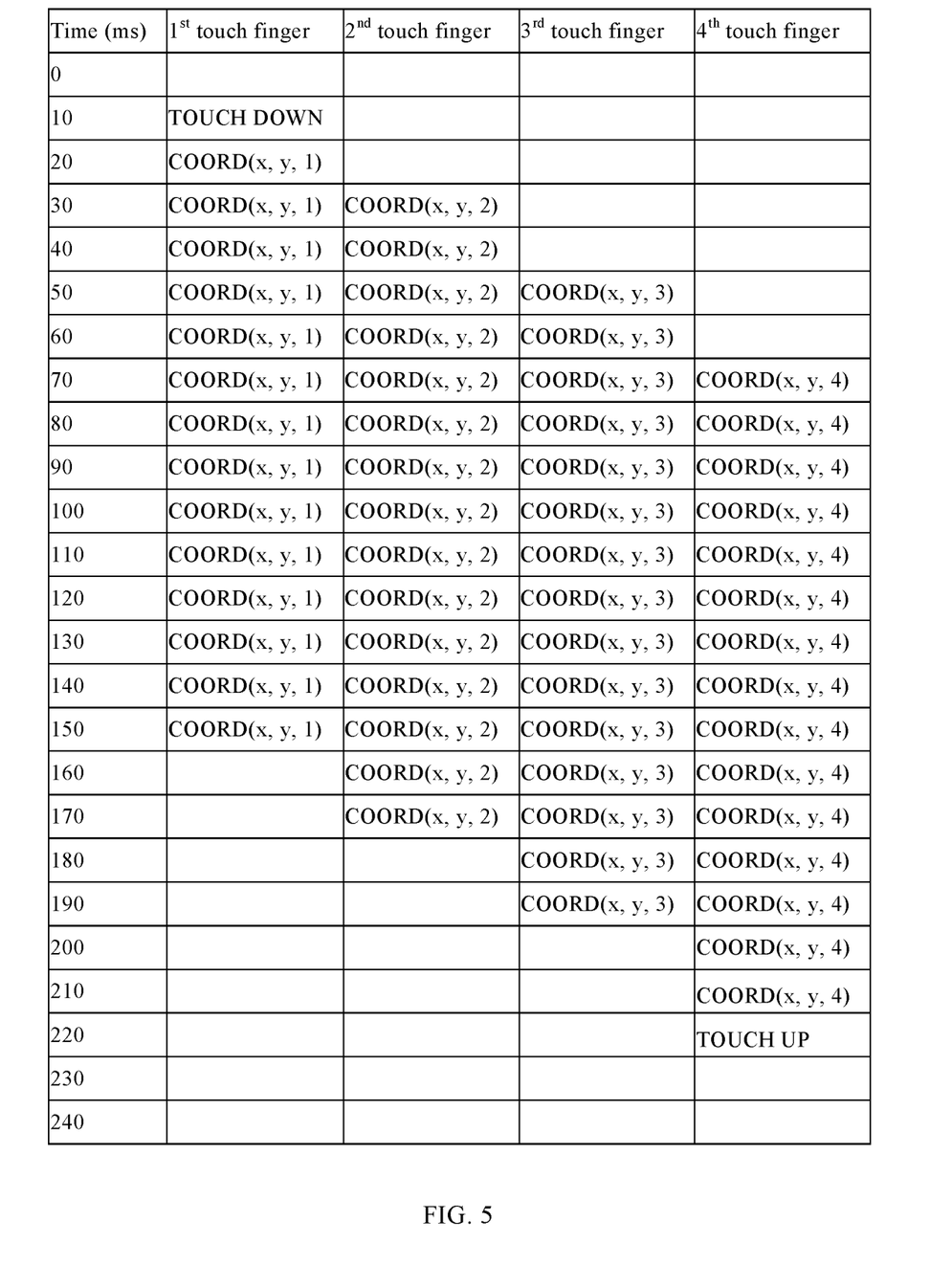
FIG. 5 is a schematic diagram showing the touch messages of the first touch screen and the second touch screen in FIG. 4 after fusion.

FIG. 4 is a schematic diagram showing touch messages of a first touch screen and a second touch screen before fusion according to an embodiment of the present disclosure, and FIG. 5 is a schematic diagram showing the touch messages of the first touch screen and the second touch screen in FIG. 4 after fusion.

As shown in FIG. 4, the first touch screen and the second touch screen each have two touch fingers thereon. Since the first touch screen and the second touch screen both support a maximum number of 10 touch fingers, there are 20 buffer queues. Data corresponding to touch fingers is present in the buffer queue 0, the buffer queue 1, the buffer queue 10 and the buffer queue 11, while the rest of the buffer queues do not have data corresponding to touch fingers. In this case, the reported data array has 20 pieces of head data, 16 of which are null values. The 20 pieces of head data may be arranged in the arrangement order of the buffer queues.

According to an embodiment the present disclosure, the coordinate information of the touch fingers in the buffer queues may adopt absolute coordinate information instead of relative coordinate information.

In contrast, if the relative coordinate information is used, it is not necessary to show all null values in the relative coordinate information, and after the total number of touch fingers is determined, the null values may be retained only for the touch fingers that are removed later. For example, at 160 ms, the null value corresponding to the first touch finger on the first touch screen should be retained.

According to an embodiment of the present disclosure, the step 103 may include: traversing each touch finger in the reported data array to generate tracking identity information, and packaging the touch message corresponding to the touch finger into a multi-finger touch protocol message to be appended behind the corresponding tracking identity information. A synchronization event is reported after each touch finger in the reported data array is updated.

Each time when other information such as coordinates of the fingers and the like is updated, the first reported tracking identity information is packaged into an input_mt_slot event for reporting, and the information to be updated is packaged into corresponding multi-finger touch protocol information for reporting to the system. After all the finger information is updated, a synchronization event is reported to inform the system of completion of the update.

A "TOUCH DOWN" message is reported when it is changed from a state where none of the touch screens has a touch finger thereon to a state where a touch finger begins to appear on a certain touch screen. A "TOUCH UP" message is reported when it is changed from a state where at least one touch screen has a touch finger thereon to a state where none of the touch screens has a touch finger thereon. That is, it is determined whether all the fingers on the touch screens are released each time the finger information is updated, and if so, a "TOUCH UP" message is reported to inform the system that all the fingers are released.

After the touch messages are integrated, the data to be uploaded is as shown in FIG. 5.

The fusion method for touch messages according to the embodiment of the present disclosure may further include: reporting the multi-finger touch protocol data via a same input device.

In an embodiment of the present disclosure, there is further provided a fusion terminal for touch messages, including a memory and a processor, the memory having a computer program stored thereon which, when executed by the processor, causes the processor to perform the fusion method for touch messages according to various embodiments of the present disclosure.

It should be noted that the above computer program embodiment belongs to the same concept as the method embodiments, the specific implementation process thereof is described in detail in the method embodiments, and the technical features in the method embodiments are correspondingly applicable in the apparatus embodiment.

Figure 6:
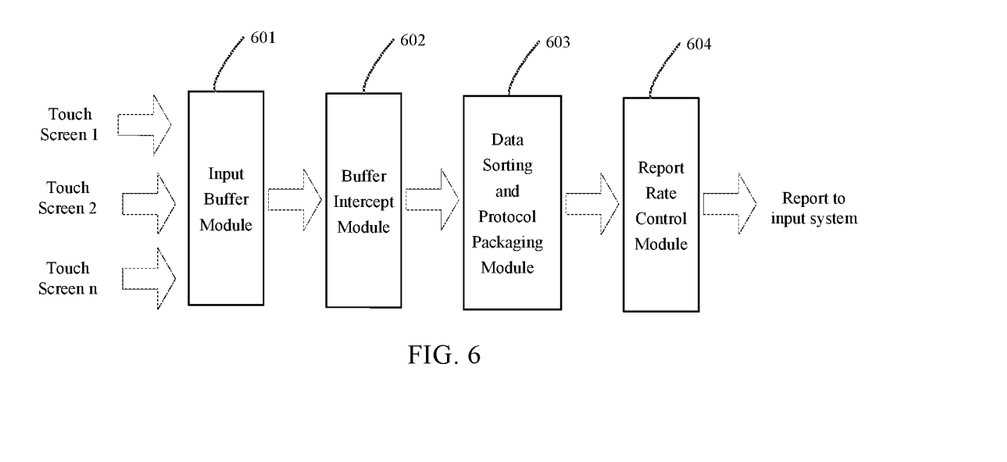
FIG. 6 is a schematic structural diagram of a fusion terminal for touch messages according to an embodiment of the present disclosure.

FIG. 6 is a schematic structural diagram of a fusion terminal for touch messages according to an embodiment of the present disclosure.

As shown in FIG. 6, The fusion terminal for touch messages according to the embodiment of the present disclosure may further include an input buffer module 601, a buffer intercept module 602, a data sorting and protocol packaging module 603, and a report rate control module 604.

The input buffer module 601 is configured to push touch messages of all touch fingers from at least two different touch screens into different buffer queues for buffering. The touch messages include at least one of: x and y coordinate information ABS_MT_POSITION_X and ABS_MT_POSITION_Y of a touch finger, area information ABS_MT_TOUCH_MAJOR and ABS_MT_TOUCH_MINOR of a touch finger, pressure information ABS_MT_PRESSURE of a touch finger, serial number information SLOT of a touch finger, and serial number information of a panel where a touch finger is located.

The buffer intercept module 602 is configured to intercept head data of each buffer queue to generate a reported data array. The head data of the buffer queue may be intercepted at a predetermined interval (e.g., 10 ms), which may be the same as or similar to an interval at which the touch messages are acquired.

The data sorting and protocol packaging module 603 is configured to acquire states of the touch fingers according to the reported data array and package the states into multi-finger touch protocol data. Each touch finger on each screen may be traversed starting with the first touch finger on the first touch screen to generate tracking identity information, and corresponding x and y coordinate information, area information, pressure information may be packaged as a multi-finger touch protocol message appended behind the corresponding tracking identity information.

The report rate control module 604 is configured to control a reporting speed of the multi-finger touch protocol data according to a preset time interval.

In an embodiment of the present disclosure, the reported data array generated by the buffer intercept module 602 may have a constant size. If the buffer queue is empty, it indicates that there is no touch message of the touch finger in the buffer queue.

In an embodiment of the present disclosure, the input buffer module 601 may obtain absolute coordinate information of the touch fingers and serial number information of panels where the touch fingers are located, may convert the absolute coordinate information of the touch fingers according to the serial number information of the panels where the touch fingers are located to obtain relative coordinate information, and may take the relative coordinate information as the coordinate information of the touch fingers.

The data sorting and protocol packaging module 603 may traverse each touch finger in the reported data array to generate tracking identity information, and may package the touch message corresponding to the touch finger into a multi-finger touch protocol message to be appended behind the corresponding tracking identity information. A synchronization event is reported after each touch finger in the reported data array is updated.

Each time when other information such as coordinates of the fingers and the like is updated, the first reported tracking identity information is packaged into an input_mt_slot event for reporting, and the information to be updated is packaged into corresponding multi-finger touch protocol information for reporting to the system. After all the finger information is updated, a synchronization event is reported to inform the system of completion of the update.

The data sorting and protocol packaging module 603 may further report a "TOUCH DOWN" message and a "TOUCH UP" message.

In an embodiment of the present disclosure, there is further provided a computer-readable storage medium storing a computer program thereon which, when executed by a processor, may cause the processor to perform the fusion method for touch messages according to various embodiments of the present disclosure.

According to the fusion method and terminal for touch messages, and the computer-readable storage medium of the present disclosure, touch messages of a plurality of touch fingers on a plurality of touch screens can be received at the same time, the reported data array is rearranged and integrated, and packaged into multi-finger touch protocol data to be reported to an operating system through an input device so that the operating system can identify and track simultaneous operations of all fingers across the screens.

The embodiments of the present disclosure have been described above with reference to the accompanying drawings, but the scope of the present disclosure is not limited thereby. Those skilled in the art can implement the present disclosure in various modifications without departing from the scope and spirit of the present disclosure, e.g., features from one embodiment can be used in another embodiment to yield yet a further embodiment. Any modification, equivalent replacement or improvement made within the technical concept of the present disclosure shall fall in the scope of the claims of the present disclosure.

What is claimed is:

1. A fusion method for touch messages, comprising:
    pushing touch messages of all touch fingers from at least two different touch screens into different buffer queues for buffering;
    intercepting head data of each buffer queue to generate a reported data array; and
    acquiring states of the touch fingers according to the reported data array and packaging the states into multi-finger touch protocol data wherein after the step of acquiring states of the touch fingers according to the reported data array and packaging the states into multi-finger touch protocol data, the method further comprises:
controlling a reporting speed of the multi-finger touch protocol data according to a preset time interval,
wherein the preset time interval is calculated according to the following equation:

$$t=1/f*1000*1000-Tc-Tr$$

wherein f is a sampling frequency of a touch panel, Tc is consumption time of obtaining the touch messages of the touch fingers, and Tr is consumption time of packaging and reporting the multi-finger touch protocol data.

2. The fusion method for touch messages according to claim 1, wherein the touch messages comprise coordinate information of the touch fingers, and the step of pushing touch messages of all touch fingers from at least two different touch screens into different buffer queues for buffering comprises:
obtaining absolute coordinate information of the touch fingers and serial number information of panels where the touch fingers are located;
converting the absolute coordinate information of the touch fingers according to the serial number information of the panels where the touch fingers are located to obtain relative coordinate information; and
taking the relative coordinate information as the coordinate information of the touch fingers.

3. The fusion method for touch messages according to claim 1, wherein after the step of acquiring states of the touch fingers according to the reported data array and packaging the states into multi-finger touch protocol data, the method further comprises:
reporting the multi-finger touch protocol data via a same input device.

4. The fusion method for touch messages according to claim 1, wherein the step of acquiring states of the touch fingers according to the reported data array and packaging the states into multi-finger touch protocol data comprises:
traversing each touch finger in the reported data array to generate tracking identity information, and packaging the touch message corresponding to the touch finger into a multi-finger touch protocol message to be appended behind the corresponding tracking identity information; and
reporting a synchronization event after each touch finger in the reported data array is updated.

5. The fusion method for touch messages according to claim 1, wherein the step of acquiring states of the touch fingers according to the reported data array and packaging the states into multi-finger touch protocol data comprises:
reporting a "TOUCH DOWN" message when it is changed from a state where none of the touch screens has a touch finger thereon to a state where a touch finger begins to appear on a certain touch screen.

6. The fusion method for touch messages according to claim 1, wherein the step of acquiring states of the touch fingers according to the reported data array and packaging the states into multi-finger touch protocol data comprises:
reporting a "TOUCH UP" message when it is changed from a state where at least one touch screen has a touch finger thereon to a state where none of the touch screens has a touch finger thereon.

7. A fusion terminal for touch messages, comprising: a memory and a processor, the memory having a computer program stored thereon which, when executed by the processor, causes the processor to perform steps of:
pushing touch messages of all touch fingers from at least two different touch screens into different buffer queues for buffering;
intercepting head data of each buffer queue to generate a reported data array; and
acquiring states of the touch fingers according to the reported data array and packaging the states into multi-finger touch protocol data,
wherein when the computer program is executed by the processor, the processor further performs step of:
controlling a reporting speed of the multi-finger touch protocol data according to a preset time interval,
wherein the preset time interval is calculated according to the following equation:

$$t=1/f*1000*1000-Tc-Tr$$

wherein f is a sampling frequency of a touch panel, Tc is consumption time of obtaining the touch messages of the touch fingers, and Tr is consumption time of packaging and reporting the multi-finger touch protocol data.

8. The fusion terminal for touch messages according to claim 7, wherein the touch messages comprise coordinate information of the touch fingers, and when the computer program is executed by the processor, the processor performs steps of:
obtaining absolute coordinate information of the touch fingers and serial number information of panels where the touch fingers are located;
converting the absolute coordinate information of the touch fingers according to the serial number information of the panels where the touch fingers are located to obtain relative coordinate information; and
taking the relative coordinate information as the coordinate information of the touch fingers.

9. The fusion terminal for touch messages according to claim 7, wherein the fusion terminal for touch messages reports the multi-finger touch protocol data via a same input device.

10. The fusion terminal for touch messages according to claim 7, wherein when the computer program is executed by the processor, the processor performs steps of:
traversing each touch finger in the reported data array to generate tracking identity information, and packaging the touch message corresponding to the touch finger into a multi-finger touch protocol message to be appended behind the corresponding tracking identity information; and
reporting a synchronization event after each touch finger in the reported data array is updated.

11. The fusion terminal for touch messages according to claim 7, wherein when the computer program is executed by the processor, the processor further performs step of:
reporting a "TOUCH DOWN" message when it is changed from a state where none of the touch screens has a touch finger thereon to a state where a touch finger begins to appear on a certain touch screen.

12. The fusion terminal for touch messages according to claim 7, wherein when the computer program is executed by the processor, the processor further performs step of:
reporting a "TOUCH UP" message when it is changed from a state where at least one touch screen has a touch finger thereon to a state where none of the touch screens has a touch finger thereon.

13. A non-transitory computer-readable storage medium storing a computer program thereon which, when executed by a processor, causes the processor to perform steps of:

pushing touch messages of all touch fingers from at least two different touch screens into different buffer queues for buffering;

intercepting head data of each buffer queue to generate a reported data array; and acquiring states of the touch fingers according to the reported data array and packaging the states into multi-finger touch protocol data, wherein after the step of acquiring states of the touch fingers according to the reported data array and packaging the states into multi-finger touch protocol data, the processor further performs a step of:

controlling a reporting speed of the multi-finger touch protocol data according to a preset time interval, wherein the preset time interval is calculated according to the following equation:

$$t = 1/f * 1000 * 1000 - Tc - Tr$$

wherein f is a sampling frequency of a touch panel, Tc is consumption time of obtaining the touch messages of the touch fingers, and Tr is consumption time of packaging and reporting the multi-finger touch protocol data.

* * * * *

UNITED STATES PATENT AND TRADEMARK OFFICE
CERTIFICATE OF CORRECTION

| | |
|---|---|
| PATENT NO. | : 11,307,759 B2 |
| APPLICATION NO. | : 16/641289 |
| DATED | : April 19, 2022 |
| INVENTOR(S) | : Xiaochuan Cui |

Page 1 of 1

It is certified that error appears in the above-identified patent and that said Letters Patent is hereby corrected as shown below:

In the Specification

Column 4, Line 11, the formula reading -$m^{th}$ (1≤m=10)- should read --$m^{th}$ (1≤m≤10)--

Signed and Sealed this
Eighth Day of November, 2022

Katherine Kelly Vidal
*Director of the United States Patent and Trademark Office*